United States Patent [19]

Bezeau, Jr.

[11] Patent Number: 4,969,383

[45] Date of Patent: Nov. 13, 1990

[54] MUSICAL SCALE INDICATOR

[75] Inventor: Robert A. Bezeau, Jr., 71 Grove Park, Mt. Clemens, Mich. 48043

[73] Assignee: Scott J. Bezeau

[21] Appl. No.: 273,237

[22] Filed: Nov. 18, 1988

[51] Int. Cl.[5] .............................................. G09B 15/00

[52] U.S. Cl. .................................. 84/485 SR; 84/473

[58] Field of Search ................... 84/471 SR, 473, 474, 84/485 R, 485 SR

[56] References Cited

U.S. PATENT DOCUMENTS

| | | | |
|---|---|---|---|
| 422,964 | 3/1890 | McTammany | 84/485 R |
| 2,001,191 | 5/1935 | Golden | 84/485 SR |
| 2,663,211 | 12/1953 | Wallace | 84/485 SR |
| 2,824,479 | 2/1958 | De Rosa | 84/482 |
| 3,245,303 | 4/1966 | Patt | 84/485 R |
| 3,668,967 | 6/1972 | Malis | 84/471 |
| 3,691,895 | 9/1972 | Nessler | 84/471 |
| 3,728,931 | 4/1973 | Leonard | 84/471 R |
| 3,894,465 | 7/1975 | Simmons | 84/485 SR |
| 4,069,735 | 1/1978 | Bertram | 84/474 |
| 4,237,766 | 12/1980 | Marshall | 84/377 |
| 4,503,748 | 3/1985 | Barber | 84/474 |

FOREIGN PATENT DOCUMENTS 8401845 5/1984 World Int. Prop. O. ...... 84/485 SR

OTHER PUBLICATIONS

"Musical Merchandise Review", vol. 137, No. 11, Nov. 1978, pp. 30–31.

*Primary Examiner*—Lawrence R. Franklin

*Attorney, Agent, or Firm*—Peter D. Keefe

[57] ABSTRACT

The musical scale indicator according to a first preferred embodiment of the present invention is composed of two cooperating parts. A base is provided having thereon printed information pertaining to a particular musical instrument and which, in addition, has printed thereon fingering patterns for playing tones on that instrument arranged in a predetermined sequence indicative of any number of desired musical scales. A slidable, clear overlay is slidably connected with the base. The overlay has printed thereon the letter designations for the musical tones arranged in a predetermined sequence so as to cooperate with the fingering patterns indicated on the base in order to selectively indicate to the user the finger positions on the subject musical instrument that will produce the tones of a selected musical scale and simultaneously the finger positions on that instrument that will produce those tones.

14 Claims, 4 Drawing Sheets

MUSICAL SCALE INDICATOR

BACKGROUND OF THE INVENTION

1. Field of the Invention:

The present invention relates to a device for indicating musical notes playable in any musical scale; more particularly, the present invention is an indicator for musical notes playable in any musical scale with said notes being visually associated with the finger boards used to play selected musical instruments.

2. Description of the Prior Art:

A. Basic Music Theory, Tonality, Musical Scales, and Musical Instruments

There are many different styles of music. But, every style of music is based upon a predetermined progression of tones. Tones, or notes, are variations in pitch (sound frequency) produced by a musical instrument. It has become customary to refer to these tones by seven letter designations: A, B, C, D, E, F, and G. When these tones, or notes, repeat, as in A B C D E F G A, then the interval between the first and last tones is known as an octave. The sound frequency difference between tones is given in "steps", and the steps between each of the tones A, B, C, D, E, F, and G is not the same. There is a half-step interval between tones B and C, and between tones E and F, while there are whole-step intervals between A and B, C and D, D and E, and F and G. Each tone may be raised or lowered one-half step; these are known as the accidentals of the tone, and they are represented by a "#" sign for "sharps", which raise the tone one-half step, and represented by a "b" sign for "flats", which lower the tone one-half step. The Chromatic Scale, from which all music derives, is based upon the natural tones, A, B, C, D, E, F, and G (the white piano keys), as well as upon the accidentals F#, G#, A#C# and D# (the black piano keys).

In any melody, there is one tone which seems to dominate and be more final than any other tone. If a musical melody is played without finishing on this tone, the melody appears to the ear as somehow incomplete. This central tone is called the "tonic", or "key ". Each tonic has a set of tones which are related to it in varying degrees. When a musical score begins on a certain tone, it can be expected that certain selected tones will follow. These groups of tones, which relate to the concept of "tonality", constitute the musical "scales".

Over the years a number of musical scales have been developed, as follows.

By the seventeenth century, the following scales (or modes) were in use:

A B C D E F G A ... known as Aeolian;
B C D E F G A B ... known as Locrian;
C D E F G A B C ... known as Ionian;
D E F G A B C D ... known as Dorian;
E F G A B C D E ... known as Phrygian;
F G A B C D E F ... known as Lydian; and
G A B C D E F G ... known as Mixolydian.

The Major scale, like Ionian Mode, is based upon a succession of eight tones modeled on the tone intervals, or steps, when the succession of tones begins on C. These intervals are: C–D, D–E, E–F, F–G, G–A, A–B, and B–C; constituting steps which are: whole, whole, half, whole, whole, whole, and half. This scale is known as the "C Major Scale". Major scale beginning on other tones may be constructed, always with the steps between the third and fourth tones and the seventh and eighth tones being half steps. This is accomplished by selectively utilizing the accidentals A#, B#, C#, D#, E#, F#and G #, and $A^b$, $B^b$, $D^b$, $E^b$, $F^b$ and $G^b$ instead of the naturals A, B, C, D, E, F, and G, as necessary to achieve the intervals, or steps, of the C Major For instance, the Major Scale beginning on G is constructed as scale. For instance, the Major Scale beginning on G is constructed as follows: G A B C D E F #G.

The Minor Scale, like the Aeolian Mode, is based upon a succession of eight tones modeled on the tone intervals, or steps, when the succession of tones begins on A. These intervals are: A–B, B–C, C–D, D–E, E–F, F–G, and G–A; constituting steps which are: whole, half, whole, whole, half, whole, and whole. As in the Major Scale, the Minor Scale can be constructed so as to begin on any tone with the intervals between tones being those of A minor, by using the appropriate accidentals of the tones where required.

The foregoing Minor Scale description is known as the "Natural Minor Scale". There are two main variations of the Minor Scale. The "Harmonic Minor Scale" is an adaptation of the Minor Scale for harmonic purposes in certain melodies. The Harmonic Minor Scale raises the seventh step so that there is a half-step difference between the seventh and eighth steps of the octave. The intervals are: A–B, B–C, C–D, D–E, E–F, F–G#, and G#–A; constituting steps which are: whole, half, whole, whole, half, one and one half, and half. The "Melodic Minor Scale" additionally raises the sixth step when the melody is ascending, but the sixth and seventh degrees are restored to the natural when the melody is descending. The intervals when ascending are: A–B, B–C, D–E, E–F#, F–G#, and G#–A; constituting steps which are whole, half, whole, whole, whole and half.

A "scale" a sequential series of tones which is established under the principle of tonality. In contradistinction to this is the concept of the "chord", which is the simultaneous playing of more than one tone.

There are four basic families of musical instruments: stringed, brass, woodwinds and percussion. In each family, individual instruments have unique fingerboard positions which are required in order for the musician to produce desired tones from the instrument. As an example of a percussion instrument, the piano keyboard spans seven octaves, each octave having 12 keys, 7 white (representing naturals) and 5 black (representing accidentals).

B. Prior Art Devices to Aid Musicians

Clearly, with the extreme complexity of the musical system which has evolved over the centuries, and the additional complexities associated with particular instrument fingerboards, the beginning musician has a most difficult task on his way to musical proficiency.

In the prior art there are various attempts at making this task somewhat easier.

U.S. Pat. No. 422,964 to McTammany discloses a mechanical indicator having a base and a selectively apertured overlay, the overlay apertures cooperate with the base to indicate finger positions and blow action required by an apprentice musician who is learining to play particular songs on a brass or woodwind instrument. The overlay must be perforated for each particular tune to be played.

U.S. Pat. No. 2,001,191 to Golden discloses a chord finder for banjos composed of a top member, a bottom member and a sliding member therebetween. The top member has three rectangular slots; the bottom member has three sets of tones, each positioned to fit under a rectangular slot and arranged in groups of four across (representing the four strings of the banjo fret board). The first set represents the major chords, the second represents the minor chords and the third represents the "seventh chords". The sliding member is apertured to show finger positions necessary to play the desired chords on the instrument.

U.S. Pat. No. 2,663,211 to Wallace discloses a piano key indicator which is placed adjacent to the keys of a piano in order to teach a student the fingering positions in order to play scales on the instrument. The device has a rectangular member having windows and has a sliding member with finger numbering thereon. The sliding member is moved so that the student can see the fingering positon for playing the major and minor scales in any key.

U.S. Pat. No. 3,245,303 to Patt discloses a device to teach finger positions for fretted string instruments. The device has a series of pages having a plurality of dots thereon. An overlay having a grid pattern representative of the fretboard of a guitar is placed over the sheets, whereupon the dots serve to indicate fingering positions of the notes used to make a specific chord. The upper portion of the overlay has a vertical column of the chromatic scale, which when a tone is placed over a square on the sheet, the finger positions indicated for the chord type on that sheet is playable in that key.

U.S. Pat. No. 3,728,931 to Leonard discloses on interval measuring device composed of a holder having printed thereon a chromatic scale and a slider (one for major and one for minor scales) which slides on the holder. Since the intervals of each scale are preset by convention, the holder has printed thereon the chromatic scale and the slider has printed thereon the tones of the scale separated according to the intervals as preset by the aforesaid convention. By sliding the slider, the scale tones can be readily determined for any root tone.

U.S. Pat. No. 3,894,465 to Simmons discloses a chord finder for the guitar. A slidable member has printed thereon a simulated fret board, with accompanying notation, such as note indications. A stationary member in which the slidable member has windows through which the simulated fret board may be seen. The windows have markings thereon to show finger positions as the slidable member is slid to various positions for selection of various chords.

While each of the typical prior art devices discussed above serves to aid the student of music, most relate to predicting chords rather than the individual tones of the various scales. Those prior art devices which do address the musical scales, fail to be applicable to all the scales and all instrument families.

Accordingly, what is needed is a musical scale indicator that can both show the composer what notes are in harmony for any selected scale in any selected tonic or key note, and show the student the scale note fingering positions therefor for any instrument he or she is learning.

SUMMARY OF THE INVENTION

The present invention is a device which permits the student of music and composers of music to readily determine each and every tone of any musical scale, while simultaneously obtaining information on which keys or frets of a musical instrument are to be played in order to produce each of the indicated tones of the desired musical scale.

The musical scale indicator according to a first preferred embodiment of the present invention is composed of two cooperating parts. A base is provided having thereon printed information pertaining to a particular musical instrument and which, in addition, has printed thereon fingering patterns for playing tones on that instrument arranged in a predetermined sequence indicative of any number of desired musical scales. A slidable, clear overlay is slidably connected with the base. The overlay has printed thereon the letter designations for the musical tones arranged in a predetermined sequence so as to cooperate with the fingering patterns indicated on the base in order to selectively indicate to the user the finger positions on the subject musical instrument that will produce the tones of a selected musical scale and simultaneously the finger positions on that instrument that will produce those tones.

Accordingly, it is an object of the present invention to provide a musical scale indicator that will provide the user with information of what tones are associated with any musical scale.

It is a further object of the present invention to provide a musical scale indicator that will provide the user with information on what tones are associated with any musical scale and simultaneously which finger board positions of a particular musical instrument will play those tones.

It is a further object of the present invention to provide a simple, easy, comprehensible device which is readily manipulated to provide information on each tone of any selected musical scale and, simultaneously, the instrument fingering positions necessary to play the tones of any said scale on a finger board of a preselected musical instrument.

These, and additional objects, advantages, features and benefits of the invention will become apparent from the following specification.

DETAILED DESCRIPTION OF THE PREFERRED EMBODIMENTS

Presently, when someone is learning to play a musical instrument, he or she must first learn the musical scales, then learn the fingering positions on the particular instrument being learned. Confusion is caused in the mind of the student because each of these are learned separately and the student is required to put them together on his or her own. The present invention is of particular usefulness to students of music because it permits the student to see simultaneously both the notes to be played in any selected musical scale and the fingering position that is required for playing those notes on the musical instrument being learned. Thus, the present invention is of major significance, in that it provides the necessary integration of learning the scales and the instrument, while saving an enormous amount of time.

Figure 1:
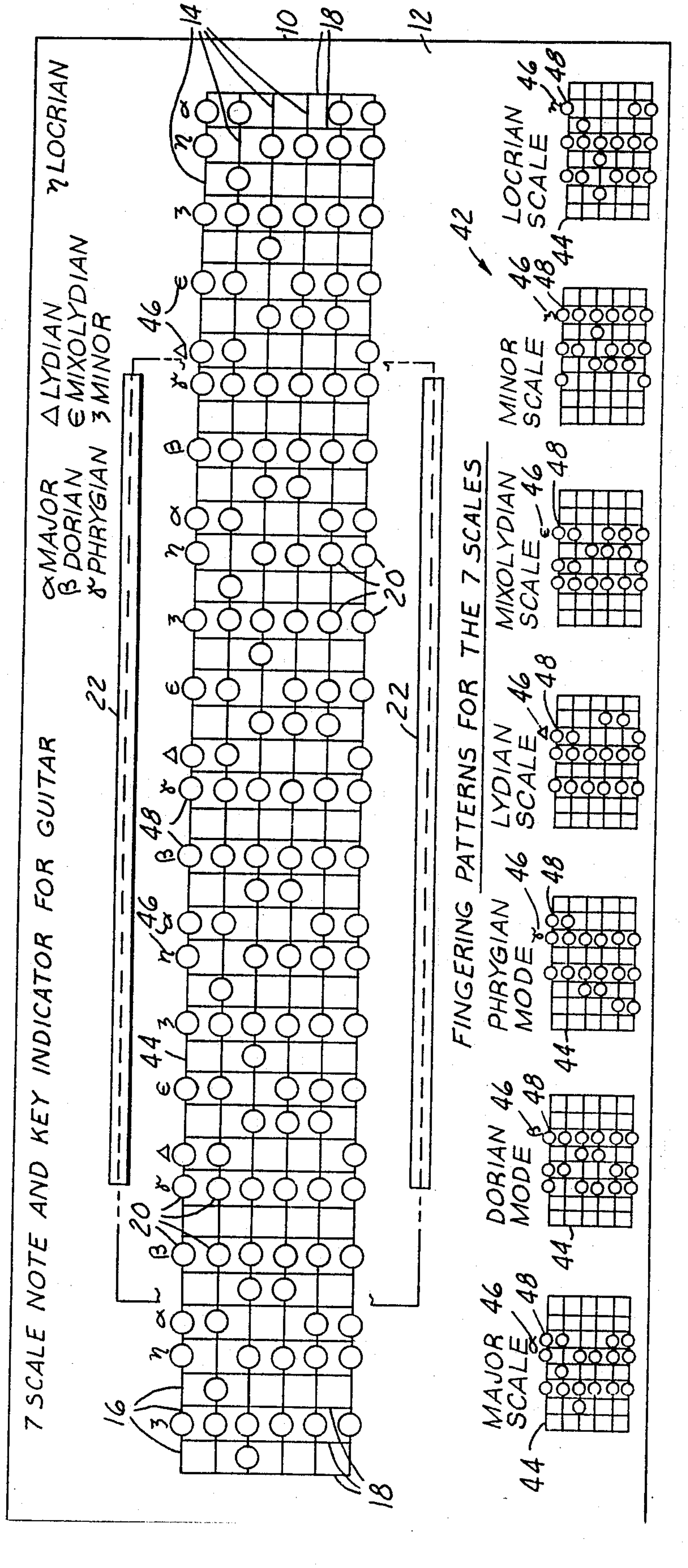
FIG. 1 is a plan view of the base according to a first preferred embodiment of the present invention, in which is indicated fingering positions on the strings for a fret board of a stringed instrument, namely the guitar.
Figure 5:
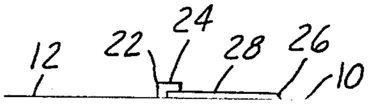
FIG. 5 is a sectional side view along lines 5—5 in FIG. 4.

Referring now to the figures, FIG. 1 shows a first embodiment of the invention for use with stringed instruments. A base 10 has printed on the surface 12 thereof indicia indicative of the fingering patterns for selected scales on a simulated fret board of a guitar. The six strings of the guitar are represented by six horizontally oriented string lines 14. The six string lines 14 in combination represent the strings that would be found on the fret board of a guitar. The string lines 14 are divided into a plurality of vertical columns 16 by a number of vertically oriented lines 18. Each of the vertical columns represents a finger contact region on the string lines 14. Located on the string lines 14 are a plurality of fret board fingering pattern indicia 20. The fingering pattern indicia are selectively located on the string lines 14 in a manner to be described hereinbelow. The base 10 is preferred to be constructed of a stiff cardboard type of material, but could be made from any material which can provide a flat surface. Located in parallel relationship with the string lines 14 and equally spaced therefrom, is a pair of lips 22, preferrably constructed of plastic, which are firmly attached to the base 10. The lips provide mutually facing overhangs 24, shown in FIG. 5, each overhang being spaced from the surface 12 of the base 10.

Figure 2:
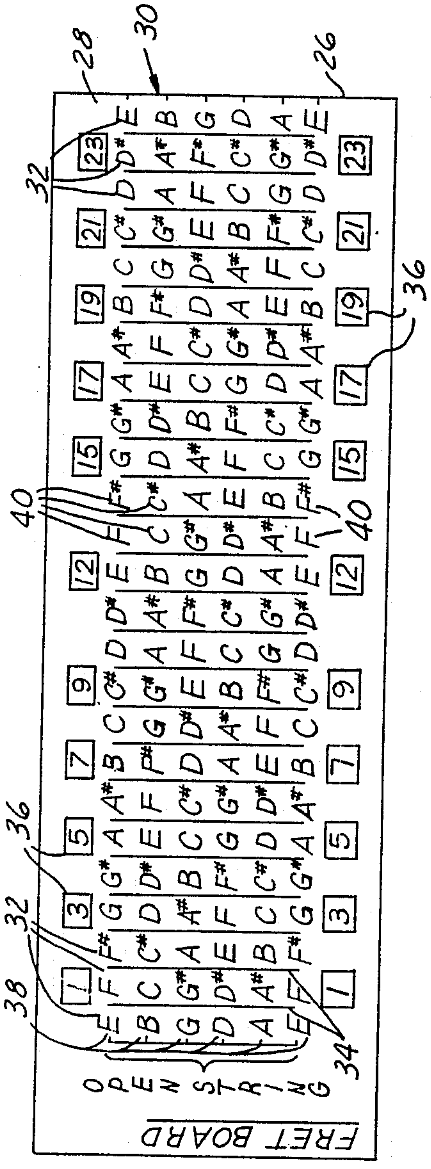
FIG. 2 is a plan view of the overlay according to the first preferred embodiment of the present invention, having printed thereon a simulated fret board for a guitar.

FIG. 2 shows a clear overlay 26 which is structured to fit under the overhangs 24 of the lips 22 and be slidable therealong. The overlay 26 is preferred to be made of a flexible, clear plastic sheet, and has indicia imprinted on its surface 28 which is indicative of a simulated fret board 30 of a guitar. The simulated fret board 30 has twenty-four frets 32 which are demarcated by a number of vertical lines 34, which represent fret bars on the fret board. The width of the frets 32 is the same as the width of the columns 16 on the base. Every other fret has a fret number indicator 36 next to it so that the user may easily identify each of the frets 32. Immediately adjacent the first fret is a vertical listing of open string tone letters 38, each of which representing the open string tone letter of each of the string lines 14 of the base. The open string tone letters 38 are spaced so as to coincide with the string lines 14 when the overlay 26 is positioned above the base 10 and slid along the lips 22. The overlay 26 additionally has a series of tone letters 40 which follow each respective open string tone letter 38 along its respective string line 14 of the base 10. Each of the tone letters 40 follow its respective open string tone letter in the sequence of the chromatic scale.

Figure 3:
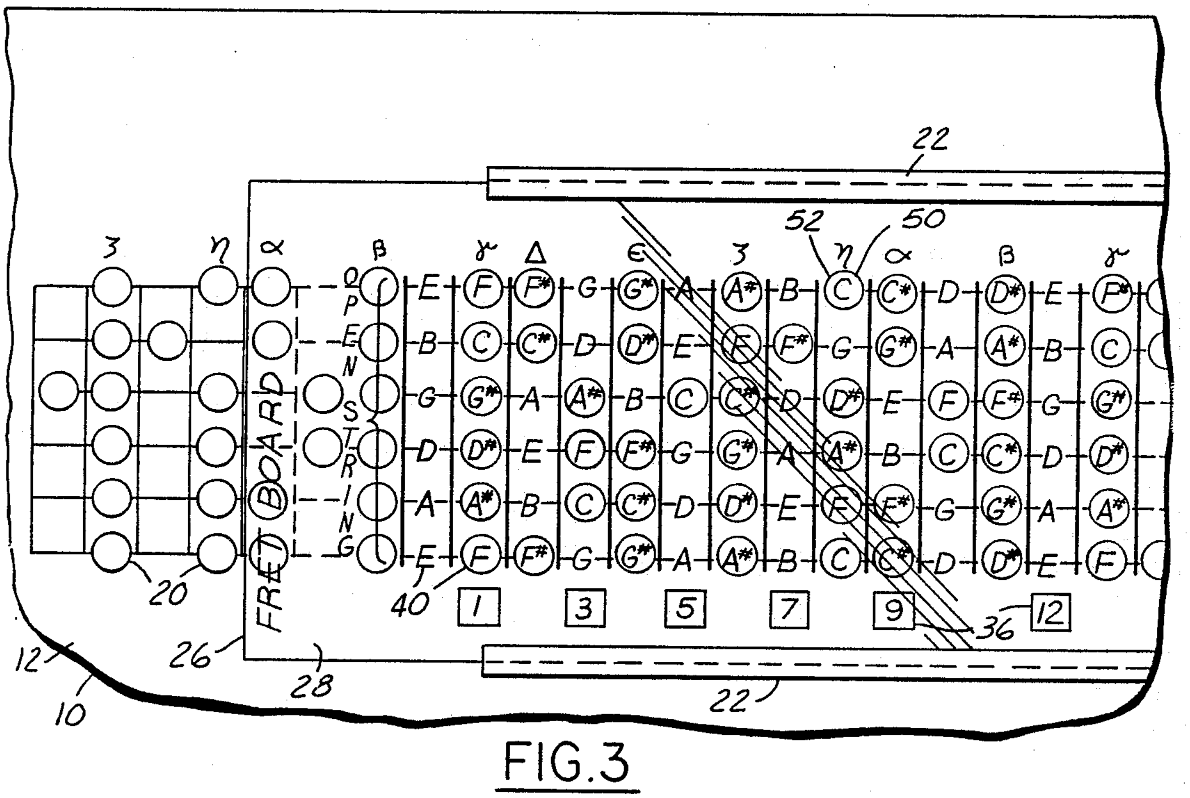
FIG. 3 is a fragmentary plan view of the first preferred embodiment of the present invention in operation, in which the overlay is positioned to indicate the tones and the instrument fingering positions for a first preselected tonic or key note in a first preselected scale.

As can be seen from FIG. 3, the overlay 26 is positioned above the surface 12 of the base 10 so that it is slidably guided and held adjacent the base by interference with the lips 22. In this mounting configuration of the overlay on the base, the tone letters 40 horizontally coincide with respective string lines 14. The overlay 26 is slidable in either horizontal direction along the lips 22 so that the frets 32 and the tone letters 40 may be made to selectively coincide with columns 16 on the base 10.

The primary object of the present invention is to show a user what tones or notes are playable in a particular scale on a particular musical instrument. This object is accomplished by the hereinabove described cooperative engagement of the base 10 and the overlay 26, in conjunction with a series of fingering pattern indicia 20 located on the surface of the base in the columns 16 on the string lines 14 that are selected to show the fingering position of playing the chromatic scale notes selected for any musical scale in any key. It is preferred that the fingering indicia be in the form of circles, but any other clearly visible marking is acceptable.

The method for attaining the aforesaid fingering positions from the chromatic scale of any musical scale in any key is based upon: (1) the string line and column indicia on the surface of the base, which shows through the overlay; (2) the fret and tone letter indicia on the surface of the overlay which cooperates with the indicia on the surface of the base; and 3) the fingering pattern indicia on the surface of the base which shows the tone letters from the chromatic scale as played vertically across the string lines for a selected musical scale.

Before thoroughly explaining the operation of this method, it is first necessary to appreciate the theory behind the placement of the fingering pattern indicia 20 on the surface 12 of the base 10. FIG. 1 shows the fingering pattern indicia for playing musical scales vertically across the strings of a guitar for several scales, namely Major, Dorian, Phrygian, Lydian, Mixolydian, Minor and Locrian. The fingering patterns 42 for each of the aforesaid scales are shown at the bottom of FIG. 1. The fingering pattern indicia 20 for these scales are sequentially displayed on the surface of the base in an at least partially superimposed order of Locrian, Major, Dorian, Phrygian, Lydian, Mixolydian, Minor, etc. At least partial superposition of the scales is possible due to the similarity of patterns in some of the fingering pattern indicia locations. Above, or alternatively within, one of the fingering pattern indicia located at the uppermost string line 44 is a lead note indicia 46 which indicates that this is the lead (or key) note fingering pattern position 48 for the particular scale. This lead note fingering pattern position 48 is designated by a unique lead note indicia 46 for each scale. In the figures, the different key note fingering positions are identified by respective lead note indicia 46 given as Greek alphabet symbols, as follows: Major, alpha; Dorian, beta; Phrygian, gamma; Lydian, delta; Mixolydian, epsilon; Minor, zeta; and Locrian, eta. Of course, other lead note indicia are possible besides the Greek letters, such as a color coding scheme which could be located within the circle indicia of the lead note fingering pattern position for each musical scale.

Operation of the invention according to the first embodiment will now be described with particular reference to FIGS. 3 and 4.

FIG. 3 shows a first example of operation. Let us say that a user wants to determine the scale notes for "C Locrian". In order to achieve this information, the user slides the overlay 26 relative to the base 10 so that the tone letter "C" on the overlay is aligned so as to be located directly over the lead note fingering pattern position 52 for the Locrian Scale as indicated by the lead note indicia for the Locrian Scale, eta, on the base 10. With the overlay in this alignment relative to the base, the user will see at a glance each and every note playable on the simulated fret board 30. The playable notes in "C Locrian" are indicated by each and every tone letter 40 which lies above a fingering pattern indicia 20. Of course, when the user selects "C Locrian", as described above, the user will have simultaneously selected a number of other musical scales in other lead note fingering positions. For instance, the "C Locrian" selection also selects "F Phrygian", "F-Sharp Lydian", "G-Sharp Mixolydian", "A-Sharp Minor", "C-Sharp Major", and "D-Sharp Dorian".

Figure 4:
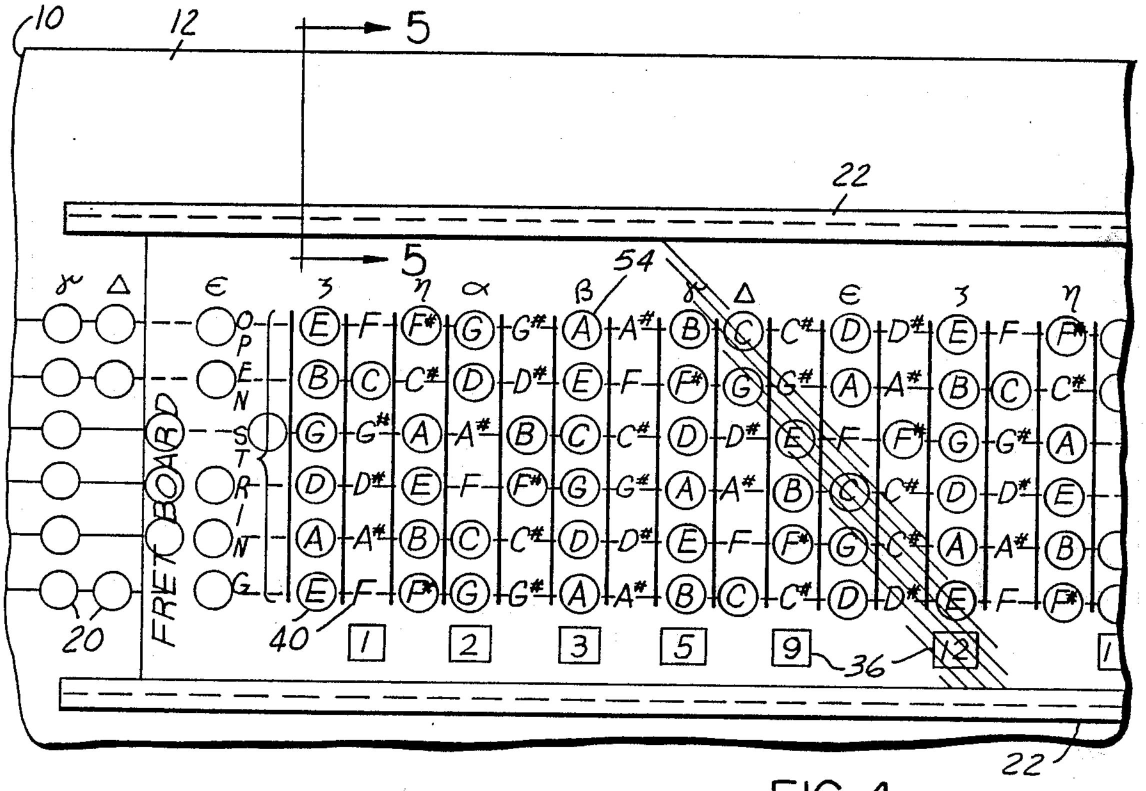
FIG. 4 is a fragmentary plan view as in FIG. 3, now showing the tones and the instrument positions for a second preselected tonic or key note in a second preselected scale.

FIG. 4 shows a second example of operation. Now, let us say the user wants to determine the scale notes for "A Dorian". In order to achieve this information, the user slides the overlay 26 relative to the base so that the tone letter "A" on the overlay is aligned so that it is located directly over the lead note fingering position 54 for the Dorian Scale as indicated by the lead note indicia for the Dorian Scale, beta, on the base 10. Again, with the overlay in this alignment relative to the base, every playable note on the simulated fret board 30 will be displayed for "A Dorian", the playable notes being those tone letters 40 on the overlay which are directly above a fingering pattern indicia 20 on the base. Further, a selection of "A Dorian", is simultaneously the informational equivalent of a selection of "E Minor", "F-sharp Locrian", "G Major", "B Phrygian", "C Lydian", and "D Mixolydian".

From the foregoing description it should be clear to those skilled in the art that the present invention is adaptable for use with any musical scale. A user would select a series of chromatic scale notes to create a desired musical scale, then choose a chromatic scale note as the lead or key note of that scale. Then the user would find every location of these notes on the finger board of the musical instrument in order to form a scale pattern of fingering indicia which repeats up and down the surface of the base. Then the simulated finger board on the overlay as hereinabove described can be selectively slid up or down the base in the manner hereinabove described so that the scale may be playably indicated for any selected lead note.

While the above preferred embodiment of the present invention is applied to the fret board of a guitar, it should be clear to those skilled in the art that the present invention can be readily and easily adapted for use with the other families of musical instruments. FIGS. 6–9 are examples of alternative embodiments, showing how the present invention may be adapted to the alto-saxophone and the piano.

Figure 6:
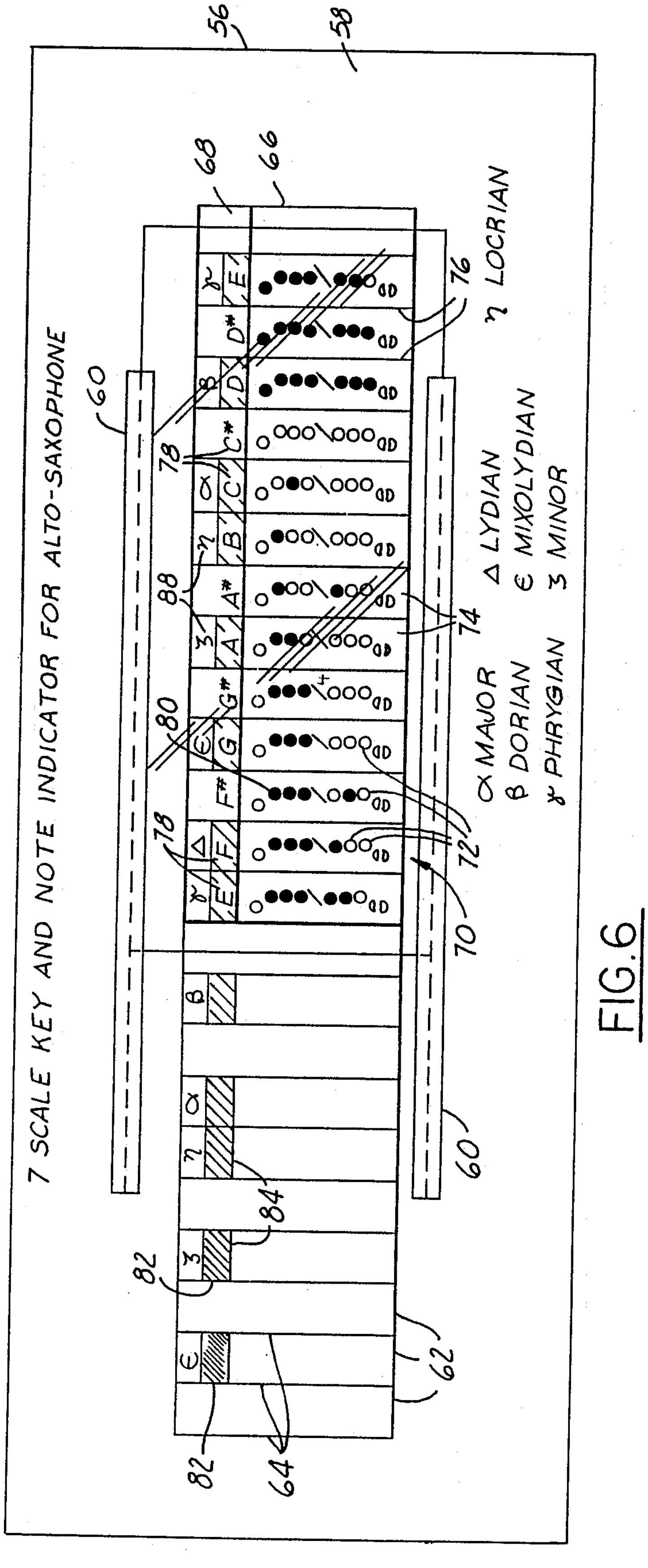
FIGS. 6 and 7 are plan views of a second preferred embodiment of the present invention for indicating the tones of scales and finger positions therefor for a brass or woodwind instrument, namely the alto-saxophone.
Figure 7:
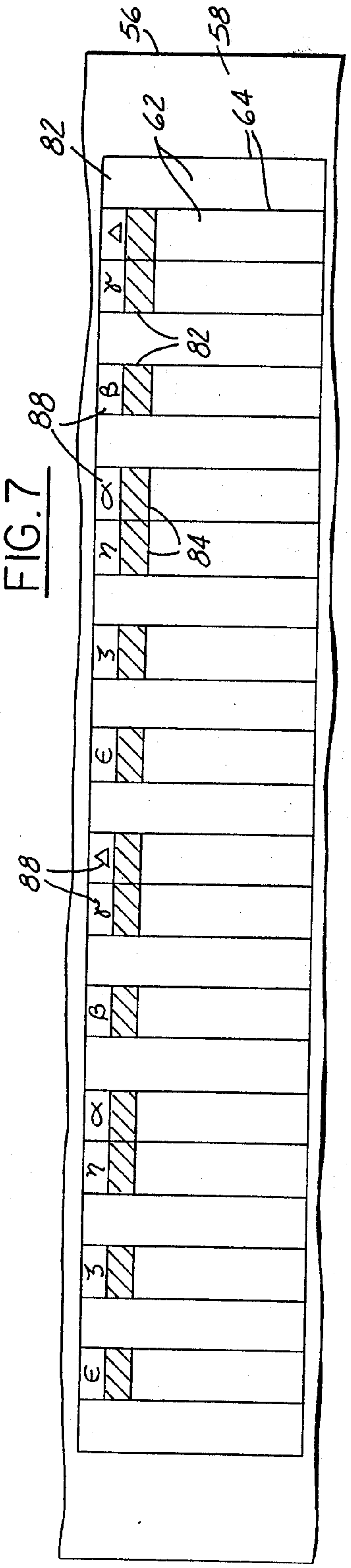

FIGS. 6 and 7 show a second embodiment of the present invention adapted for use in the class of brass and woodwind instruments, namely for the alto-saxophone. The base 56 for the alto-saxophone is constructed like that of the base 10 for the guitar, in that it has a flat surface 58 and a pair of mutually parallel, spaced apart lips 60. Imprinted on the surface 58 of the base 56 is a series of columns 62 which are demarcated by a number of vertical lines 64. The clear overlay 66 is structured like that of the overlay 26 for the guitar, but has imprinted on its surface 68 a repetitive number of a simulated finger boards 70 for the alto-saxophone. The simulated finger boards 70 are provided by eight circles 72, each representing a fingering key on the alto-saxophone. The overlay surface 68 has a number of columns 74 demarcated by a number of vertical lines 76. In each column 74 is one of the simulated finger boards 70. Each column 74 on the overlay surface 68 has the same width as each column 62 on the base surface 58. Within each column 74, above its respective simulated finger board 70 is located a tone letter 78 from the chromatic scale. The tone letters 78 are in sequence from left to right, starting on E. In order to produce the indicated note of the letter tone in each column, the respective simulated key board in that column has the required keys which must be played indicated by solid circles 80. The surface 58 of the base 56 has, an upper portion 82 of each column 62 a fingering pattern indicia 84, shown in the figures by a cross-hatching, indicating whether that column is a column representing a fingering position to produce scale notes. Above each fingering pattern indicia 84 is a lead note indicia 88, using the Greek alphabet in the manner hereinabove described for the guitar embodiment.

Operation of the present invention for the alto-saxophone will now be described using FIG. 6. Let us say that a user wishes to find the notes and keys playable in "C Major". Then, the user simply slides the overlay 66 until the tone letter C is aligned so as to be directly below the Greek letter alpha on the base 56. Each of the tone letters which are playable in that scale are then indicated where the tone letter 78 on the overlay 66 coincides with a fingering pattern indicia 84 on the base 56. Further, the keys to be played on the alto-saxophone are indicated by the solid circles 80 of the finger boards 70 within the columns having playable tone letters.

Figure 8:
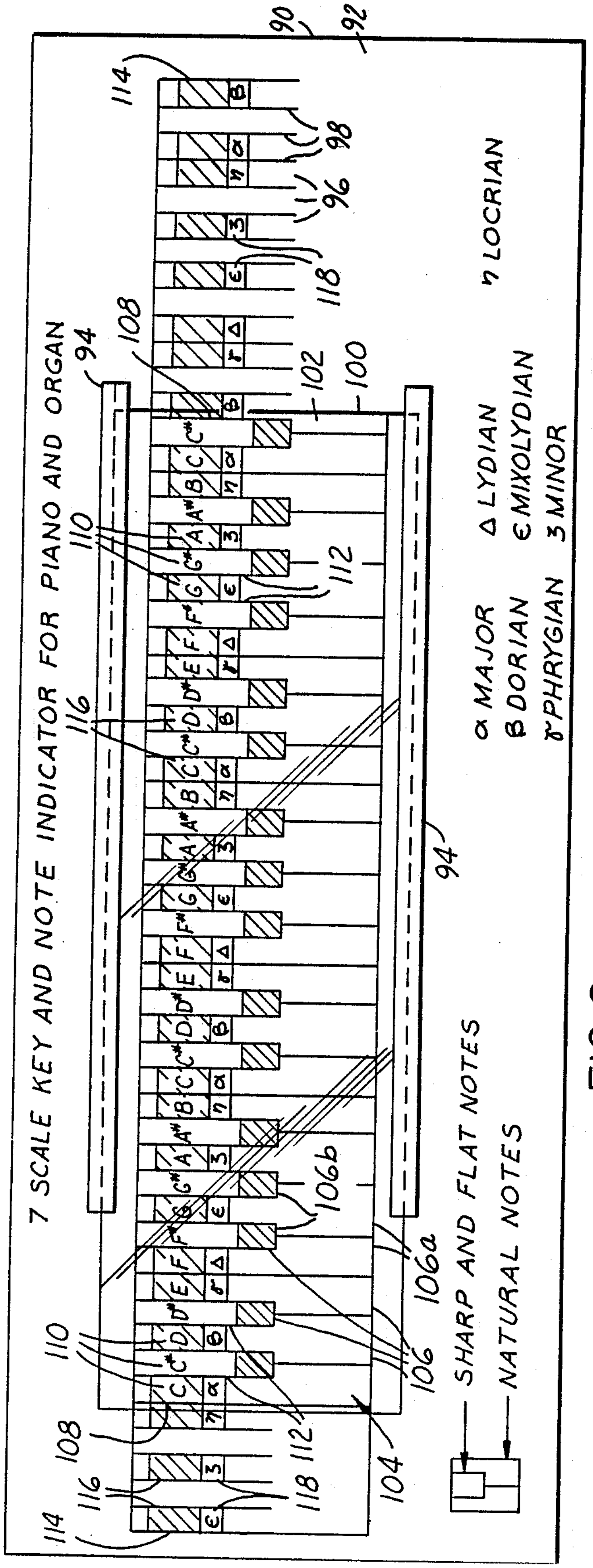
FIGS. 8 and 9 are plan views of a third preferred embodiment of the present invention for indicating the tones and finger positions therefor for a percussion instrument, namely the piano.
Figure 9:
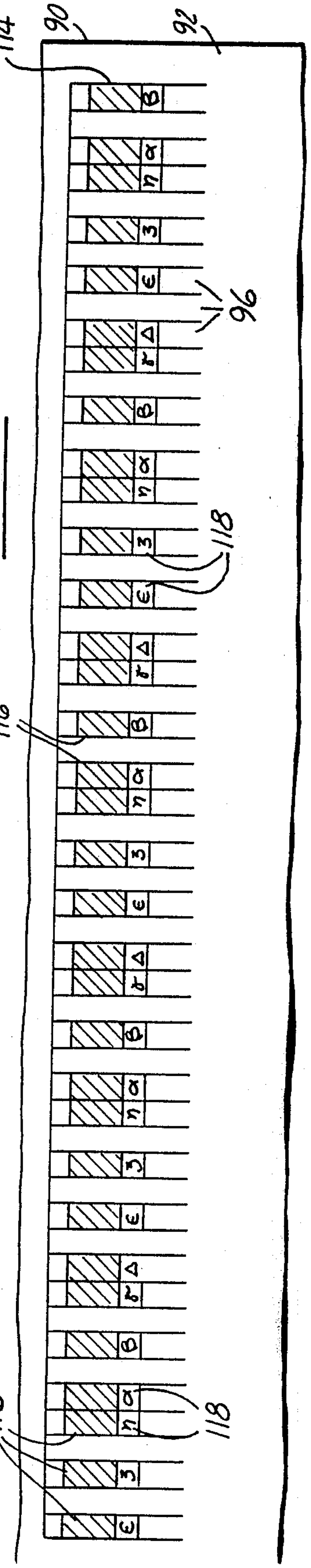

FIGS. 8 and 9 show a third embodiment of the present invention adapted for use with a percussion instrument, namely the piano. The base 90 is similar in construction to that of the base 10 for the guitar, in that it has a flat surface 92 and a pair of mutually parallel, spaced apart lips 94. Imprinted on the surface 92 of the base 90 is a series of columns 96 which are demarcated by a number of vertical lines 98. The clear overlay 100 is structured like that of the overlay 26 for the guitar, but has imprinted on its surface 102 a substantial portion of a simulated piano finger board 104. Each key 106 thereof, inclusive of white keys *106a* and black keys *106b*, has a width which is equal to the width of the columns 96 on the base surface 92. An upper portion 108 of each key 106 has a tone letter 110 imprinted which represents the note that is produced by that key. The sequence of the tone letters is based upon the chromatic scale and progresses from right to left starting with C. In order to facilitate the aforesaid tone letter marking and to afford a view of the underlying base 90, a portion 112 of the black keys is left clear. At an upper portion 114 of each column 96 on the base 90, in line with the clear portion 112 of the black keys *106b*, is a fingering pattern indicia 116, shown in the figures by cross-hatching, indicating whether that column is a column representing a fingering position to produce scale notes. Below each fingering pattern indicia 116 is a lead note indicia 118, using the Greek alphabet in the manner hereinabove described for the guitar embodiment.

Operation of the present invention for the piano will now be described using FIG. 8. Let us say that a user wishes to find the notes and keys playable in "C Major". Then the user simply slides the overlay 100 until the tone letter C is aligned so as to be directly above the Greek letter alpha. Each of the tone letters playable in that scale, and the piano keys for each of those notes represented by the tone letters, are then indicated where ever the tone letter 110 on the overlay 100 coincides with a fingering pattern indicia 116 on the base 90.

Based upon the foregoing detailed description of particular embodiments of the present invention, it is clear that the present invention, which takes a simulated finger board for a musical instrument and selectively combines this with musical scale fingering patterns derived from the chromatic scale, is adaptable by those skilled in the art to any musical instrument and any musical scale.

To those skilled in the art to which this invention appertains, the above described preferred embodiments may be subject to change or modification. Such change or modifications can be carried out without departing from the scope of the invention, which is intended to be limited only by the scope of the appended claims.

What is claimed is:

1. A music scale indicator, comprising:

a base having a first flat surface, said first flat surface having a first indicia placed thereon indicating fingering patterns for playing at least three pre-selected music scales in selected tonics on a pre-selected musical instrument, said first indicia comprising fingering indicia for indicating fingering patterns for playing said pre-selected music scales on said pre-selected musical instrument and lead note indicia for indicating a lead note location of each fingering pattern of said fingering patterns for each said pre-selected music scale of said pre-selected music scales;

an overlay having a second flat surface positioned in parallel relation with said first flat surface of said base; said overlay being constructed of a material which permits seeing through said overlay so that said second flat surface of said overlay and said first flat surface of said base may be simultaneously seen, said second flat surface of said overlay having a second indicia placed thereon indicating a simulated finger board of said pre-selected musical instrument, said simulated finger board indicating fingering positions for said pre-selected musical instrument, said second indicia further indicating a chromatic scale tone letter for each fingering position of said fingering positions for said pre-selected musical instrument, the chromatic tone letters being arranged in chromatic scale sequence, said overlay being slidably moved relative to said base so as to selectively indicate fingering positions for playing a selected music scale in a selected tonic on said simulated finger board of said pre-selected musical instrument, said selected tonic for said selected music scale being selected by sliding said overlay relative to said base until a selected chromatic scale tone letter that defines said selected tonic on said overlay aligns with a selected lead note indicia that indicates the selected music scale on said base, selection of said selected tonic for the selected music scale also simultaneously selecting a particular tonic respectively for each other music scale of said pre-selected music scales, a tonic being selected wherever a chromatic scale tone letter of said chromatic tone letters on said second surface of said overlay aligns with a lead not indicia on said first surface of said base, said selected fingering indicia for the selected music scale in the selected tonic and for each other music scale in its respective particular tonic being indicated wherever a tone letter indicia overlays a fingering pattern indicia; and attachment means connected with said base for attaching said overlay to said flat surface of said base so that said second flat surface of said overlay may be selectively slid relative to said first flat surface of said base.

2. The music scale indicator of claim 1, wherein each fingering pattern of said fingering patterns on said base is a fingering pattern for each pre-selected music scale of said pre-selected music scales arranged in sequence of playing selected scale notes from the chromatic scale on said finger board of said pre-selected musical instrument.

3. The music scale indicator of claim 2, wherein said pre-selected music scales comprise seven music scales; further wherein said fingering patterns comprise fingering patterns for Major, Minor, Locrian, Mixolydian, Lydian, Phrygian, and Dorian music scales.

4. The music scale indicator of claim 3, wherein said pre-selected musical instrument is selected from the group consisting of string instruments, brass and woodwind instruments and percussion instruments.

5. The music scale indicator of claim 4, wherein said pre-selected musical instrument is selected from the group consisting of guitar, alto-saxophone and piano.

6. A music scale indicator, comprising:

a base having a first flat surface, said first flat surface having a first indicia placed thereon indicating fingering patterns for playing pre-selected music scales in selected tonics on a pre-selected musical instrument, said pre-selected music scales comprising Major, Minor, Mixolydian, Phrygian, Locrian, Lydian and Dorian music scales, said first indicia comprising fingering indicia for indicating fingering patterns for playing said pre-selected music scales on said pre-selected musical instrument and lead note indicia for indicating a lead note location of each fingering pattern of said fingering patterns for each said pre-selected music scale of said pre-selected music scales;

an overlay having a second flat surface positioned in parallel relation with said first flat surface of said base; said overlay being constructed of a material which permits seeing through said overlay so that said second flat surface of said overlay and said first flat surface of said base may be simultaneously seen, said second flat surface of said overlay having a second indicia placed thereon indicating a simulated finger board of said pre-selected musical instrument, said simulated finger board indicating fingering positions for said pre-selected musical instrument, said second indicia further indicating a chromatic scale tone letter for each fingering position of said fingering positions for said pre-selected musical instrument, the chromatic scale tone letters being arranged in chromatic scale sequence, said overlay being slidably moved relative to said base so as to indicate fingering positions for playing a selected music scale of said pre-selected music scales in a selected tonic on said simulated finger board of said pre-selected musical instrument, said selected tonic for said selected music scale being selected by sliding said overlay relative to said base until a selected chromatic scale tone letter that defines said tonic on said overlay aligns with a selected lead note indicia that indicates the selected scale on said base, selection of said selected tonic for the selected music scale also simultaneously selecting a particular tonic respectively for each other music scale of said pre-selected music scales, a tonic being selected wherever a chromatic scale tone letter of said chromatic tone letters on said second surface of said overlay aligns with a lead note indicia on said first surface of said base, said selected fingering indicia for the selected music scale in the selected tonic and for each other music scale in its respective particular tonic being indicated wherever a tone letter indicia overlays a fingering pattern indicia; and attachment means connected with said base for attaching said overlay to said flat surface of said base so that said second flat surface of said overlay may be selectively slid relative to said first flat surface of said base.

7. The music scale indicator of claim 6, wherein each fingering pattern of said fingering patterns on said base is a fingering pattern for each pre-selected music scale of said pre-selected music scales arranged in sequence of playing selected scale notes from the chromatic scale on said finger board of said pre-selected musical instrument.

8. The music scale indicator of claim 7, wherein said pre-selected musical instrument is selected from the group consisting of string instruments, brass and woodwind instruments and percussion instruments.

9. The music scale indicator of claim 8, wherein said pre-selected musical instrument is selected from the group consisting of guitar, alto-saxophone and piano.

10. A method for finding fingering locations on a musical instrument for playing a selected music scale in a selected tonic and simultaneously for at least two other music scales in a particular respective tonic, comprising the steps of:

placing fingering patterns for playing at least three pre-selected music scales in selected tonics on a pre-selected musical instrument onto a base, said fingering patterns comprising fingering indicia for indicating fingering patterns for playing each pre-selected music scale of said pre-selected music scales, said fingering patterns further comprising lead note indicia for indicating a lead note location of each fingering pattern of said fingering patterns for each said pre-selected music scale of said pre-selected music scales;

placing a simulated finger board indicia onto a transparent overlay, said simulated finger board indicia indicating fingering positions for said pre-selected musical instrument, a chromatic scale tone letter being provided for each said fingering position, the chromatic scale tone letters being arranged in chromatic scale sequence; and aligning said overlay relative to said base so as to align a selected chromatic tone letter that defines said selected tonic on said overlay with a selected lead note indicia that indicates the selected music scale on said base, selection of said selected tonic for the selected music scale also simultaneously selecting a particular tonic respectively for each other music scale of said pre-selected music scales, a tonic being selected wherever a chromatic scale tone letter of said chromatic tone letters on said second surface of said overlay aligns with a lead note indicia on said first surface of said base, the fingering locations on said pre-selected musical instrument being indicated for the selected music scale in the selected tonic and for each other music scale in its respective particular tonic wherever a tone letter indicia overlays a fingering pattern indicia.

11. The method for finding tones playable on a musical instrument of claim 10, wherein the first said step of placing further provides for each fingering pattern of said fingering patterns on said base having a fingering pattern for each pre-selected music scale of said pre-selected music scales arranged in sequence of playing selected scale notes from the chromatic scale on said finger board of said pre-selected music instrument.

12. The method for finding tones playable on a musical instrument of claim 11, wherein the first said step of placing provides fingering patterns for Major, Minor, Locrian, Mixolydian, Lydian, Phrygian, and Dorian music scales; and said step of aligning results in a respective tonic being selected for each said pre-selected music scale, said step of aligning further providing a fingering pattern for each said pre-selected music scale in its said respective tonic.

13. The method for finding tones playable on a musical instrument of claim 12, wherein the first step of placing provides fingering indicia and the second step of placing provides simulated fingering board indicia for a pre-selected musical instrument selected from the group consisting of string instruments, brass and woodwind instruments and percussion instruments.

14. The method for finding tones playable on a musical instrument of claim 13, wherein the first step of placing provides fingering indicia and the second step of placing provides simulated fingering board indicia for a pre-selected musical instrument selected from the group consisting of guitar, alto-saxophone and piano.

* * * * *

UNITED STATES PATENT AND TRADEMARK OFFICE
CERTIFICATE OF CORRECTION

PATENT NO. : 4,969,383

DATED : November 13, 1990

INVENTOR(S) : Robert A. Bezeau, Jr.

It is certified that error appears in the above-identified patent and that said Letters Patent is hereby corrected as shown below:

Column 9;

In Claim 1, line 67, at the first word of the line, delete "indicia" and insert therefor --positions--.

Column 10;

In Claim 6, line 9, after "fingering", delete "indicia" and insert therefor --positions--.

Signed and Sealed this

Twenty-third Day of June, 1992

Attest:

DOUGLAS B. COMER

*Attesting Officer*

*Acting Commissioner of Patents and Trademarks*